(12) United States Patent
Van Ert

(10) Patent No.: US 9,481,111 B1
(45) Date of Patent: Nov. 1, 2016

(54) FUSED PARTICLE TOOLING

(71) Applicant: Jack Van Ert, Fuquay-Varina, NC (US)

(72) Inventor: Jack Van Ert, Fuquay-Varina, NC (US)

( * ) Notice: Subject to any disclaimer, the term of this patent is extended or adjusted under 35 U.S.C. 154(b) by 0 days.

(21) Appl. No.: 14/868,500

(22) Filed: Sep. 29, 2015

Related U.S. Application Data

(60) Provisional application No. 62/201,762, filed on Aug. 6, 2015.

(51) Int. Cl.
| | | |
|---|---|---|
| B29C 51/18 | (2006.01) | |
| B29C 33/38 | (2006.01) | |
| B29C 51/30 | (2006.01) | |
| B29C 51/08 | (2006.01) | |
| B29K 105/00 | (2006.01) | |

(52) U.S. Cl.
CPC ....... *B29C 33/3885* (2013.01); *B29C 33/3821* (2013.01); *B29C 51/082* (2013.01); *B29C 51/18* (2013.01); *B29C 51/30* (2013.01); *B29K 2105/256* (2013.01)

(58) Field of Classification Search
None
See application file for complete search history.

(56) References Cited

U.S. PATENT DOCUMENTS

| | | |
|---|---|---|
| 2,869,179 A | 1/1959 | Hartesveldt |
| 2,907,070 A | 10/1959 | Hartesveldt |
| 3,353,219 A | 11/1967 | Snyder |
| 3,527,854 A | 9/1970 | Martin |
| 3,530,208 A * | 9/1970 | Rausing .......... B29C 44/14 249/65 |
| 3,932,096 A | 1/1976 | Kartman |
| 4,024,623 A | 5/1977 | Kun |
| 4,236,885 A | 12/1980 | West |
| 5,238,387 A | 8/1993 | Hama |
| 5,928,597 A | 7/1999 | Van Ert |
| 6,146,578 A | 11/2000 | Van Ert |
| 6,338,618 B1 | 1/2002 | Van Ert |
| 7,326,044 B2 | 2/2008 | Kirchner |
| 8,182,259 B2 * | 5/2012 | Kuntz .......... B29C 33/308 100/194 |

FOREIGN PATENT DOCUMENTS

| | | |
|---|---|---|
| EP | 363597 A | 4/1990 |
| JP | 09277369 A | 10/1997 |

* cited by examiner

*Primary Examiner* — Monica Huson
(74) *Attorney, Agent, or Firm* — Miller Patent Services; Jerry A. Miller

(57) ABSTRACT

A method of making a vacuum fused-particle mold involves bringing the outer surface of a flexible bladder into contact with a master part; drawing a first vacuum between the flexible bladder and the master part to cause the flexible bladder to conform to its shape; placing a quantity of particles inside the compartment in sufficient quantity and distribution to cover at least a portion of the inner surface of the flexible bladder that conforms to the shape of the master part; sealing the mold compartment with a rear bladder; drawing a second vacuum on the mold compartment to hold the quantity of particles in place; removing the first vacuum to release the master part; and maintaining the second vacuum on the compartment to retain the shape of the flexible bladder. This abstract is not to be considered limiting, since other embodiments may deviate from the features described in this abstract.

27 Claims, 10 Drawing Sheets

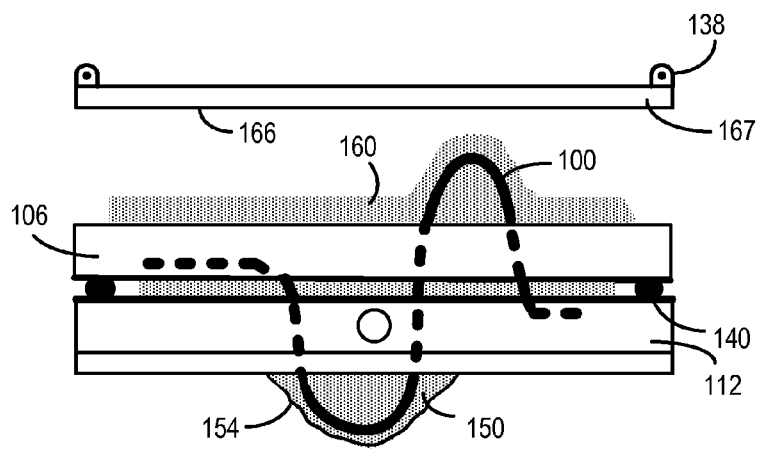
FIG. 7
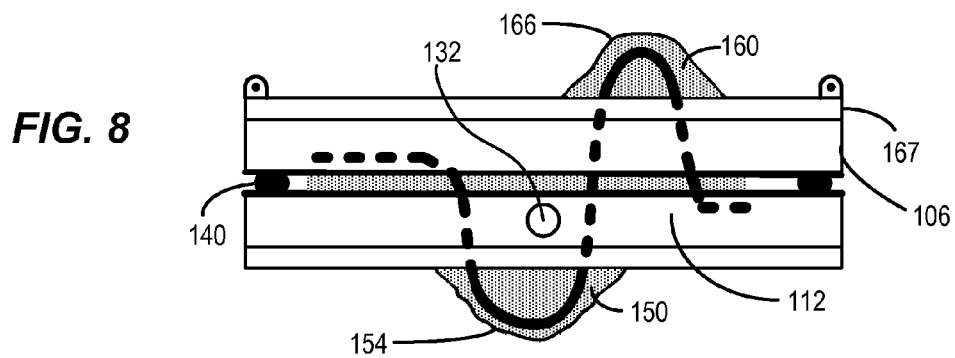
FIG. 8
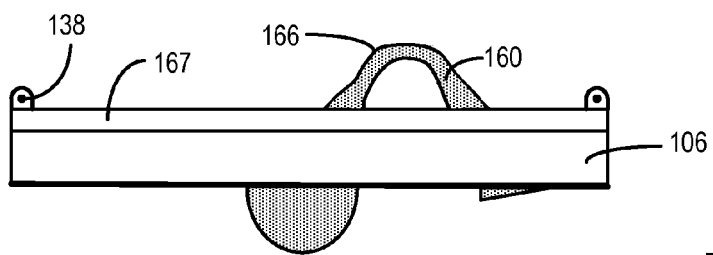
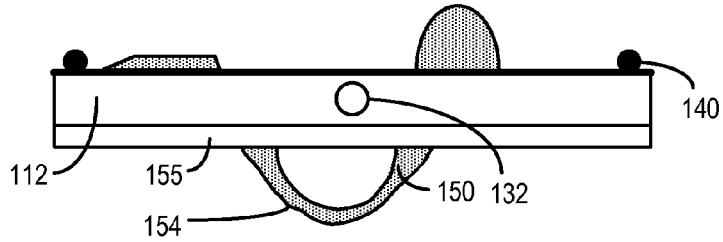
FIG. 9

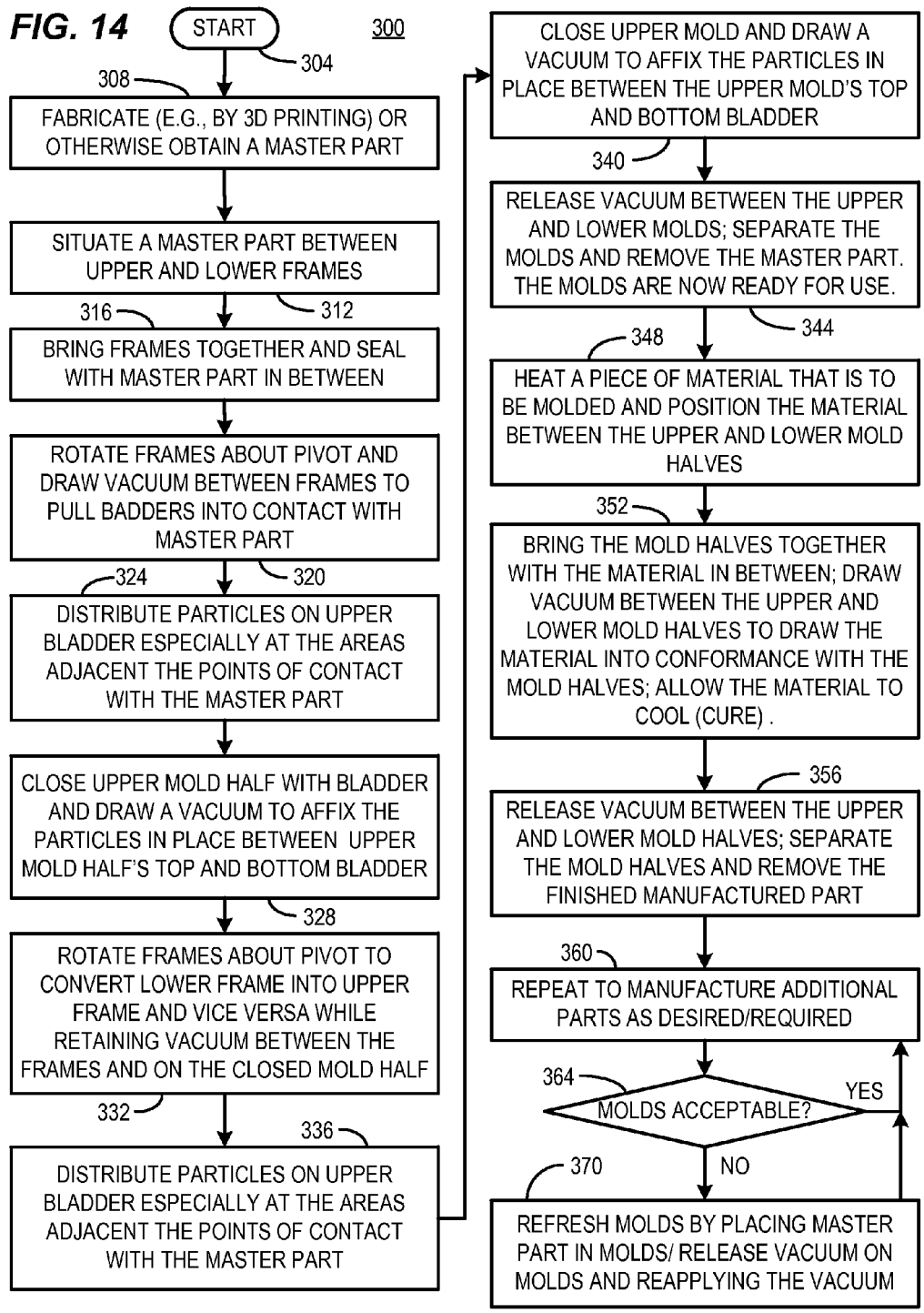

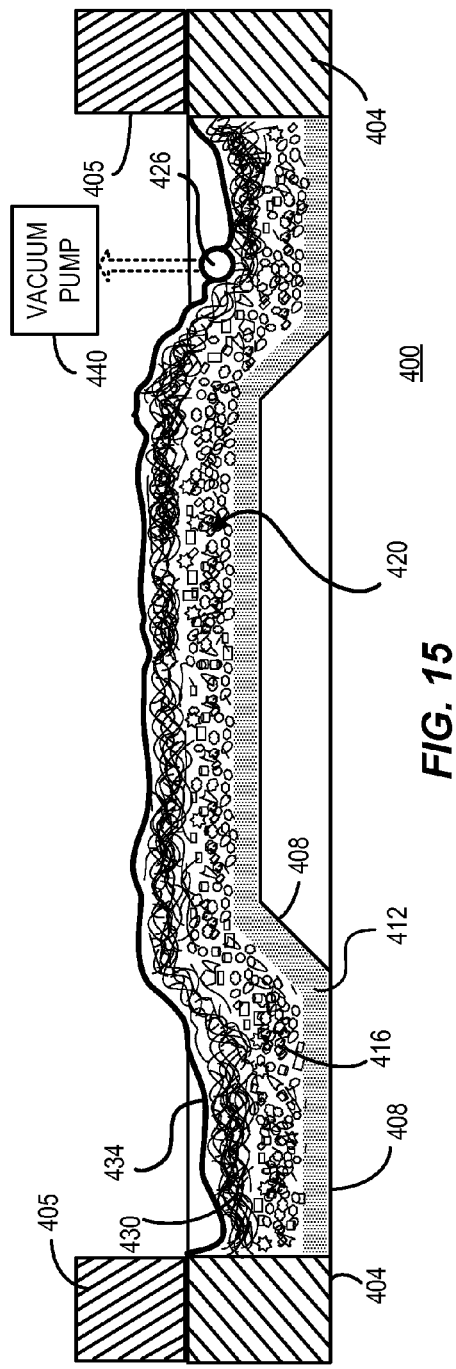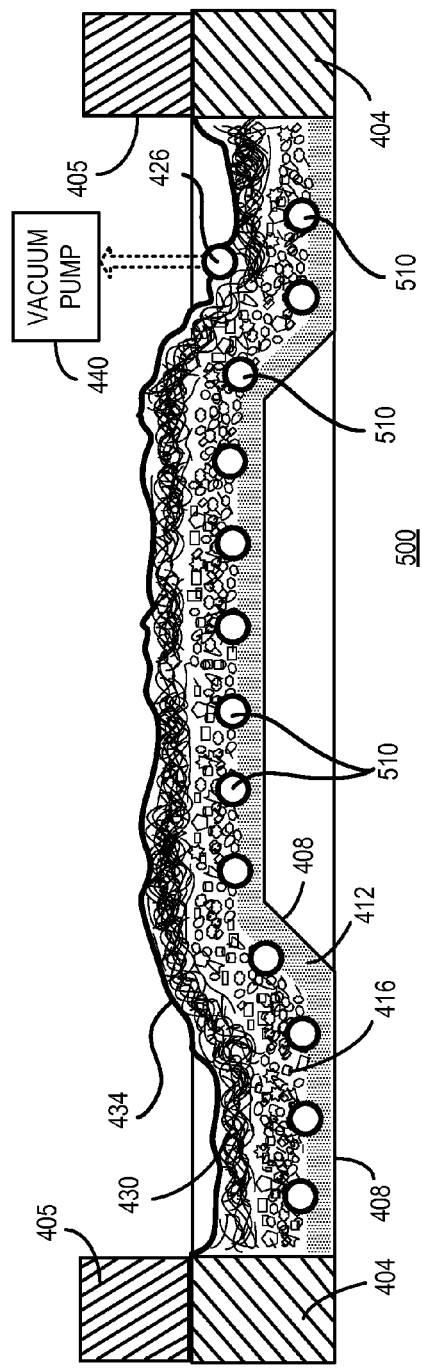

704 — PROVIDE A MOLD HAVING A MOLD COMPARTMENT WITH A FLEXIBLE BLADDER THAT DEFINES ONE SIDE THEREOF, WHERE THE FLEXIBLE BLADDER DEFINES THE ONE SIDE HAVING AN INNER SURFACE AND AN OUTER SURFACE

708 — BRING THE OUTER SURFACE OF THE FLEXIBLE BLADDER INTO CONTACT WITH A MASTER PART HAVING A SHAPE

712 — DRAW A FIRST VACUUM BETWEEN THE BLADDER AND THE MASTER PART TO CAUSE THE BLADDER TO CONFORM TO THE SHAPE OF THE MASTER PART

716 — PLACE A QUANTITY OF PARTICLES INSIDE THE COMPARTMENT IN SUFFICIENT QUANTITY AND DISTRIBUTION TO COVER AT LEAST A PORTION OF THE INNER SURFACE OF THE BLADDER THAT CONFORMS TO THE SHAPE OF THE MASTER PART

720 — SEAL THE MOLD COMPARTMENT WITH A REAR BLADDER

724 — DRAW A SECOND VACUUM ON THE MOLD COMPARTMENT TO HOLD THE QUANTITY OF PARTICLES IN PLACE

728 — REMOVE THE FIRST VACUUM TO RELEASE THE MASTER PART

732 — MAINTAIN THE SECOND VACUUM ON THE COMPARTMENT TO RETAIN THE SHAPE OF THE BLADDER

US 9,481,111 B1

FUSED PARTICLE TOOLING

CROSS REFERENCE TO RELATED DOCUMENTS

This application claims priority of U.S. provisional application 62/201,762 to Jack Van Ert filed Aug. 6, 2015, which is hereby incorporated by reference in its entirety including Appendix thereto.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

Thermoforming of sheet material can be accomplished by heating the sheet material and molding the material while hot by pressing between two half molds, or between a mold and a molding surface. Such thermoforming has been described in U.S. Pat. Nos. 5,928,597 and 6,146,578, for example, which are hereby incorporated by reference. Such processes can be used to form various objects such as automobile headliners, decorative panels, etc.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings.

FIGS. 1-8 illustrate an example process for making a vacuum fused particle mold in a manner consistent with certain example embodiments of the present invention.

FIGS. 9-13 illustrate an example process for making a finished part using a vacuum fused particle mold consistent with certain example embodiments of the present invention.

FIG. 14 is a flow chart of an illustrative process for making and using a vacuum fused particle mold consistent with certain example embodiments of the present invention.

FIG. 15 is a side cross-sectional view of an example vacuum fused particle mold consistent with certain example embodiments of the present invention.

FIG. 16 is a side cross-sectional view of another example vacuum fused particle mold having cooling tubes consistent with certain example embodiments of the present invention.

FIG. 18 is an example flow chart of an illustrative process for making a fused particle mold in a manner consistent with certain example embodiments of the present invention.

GLOSSARY

Figure 1:
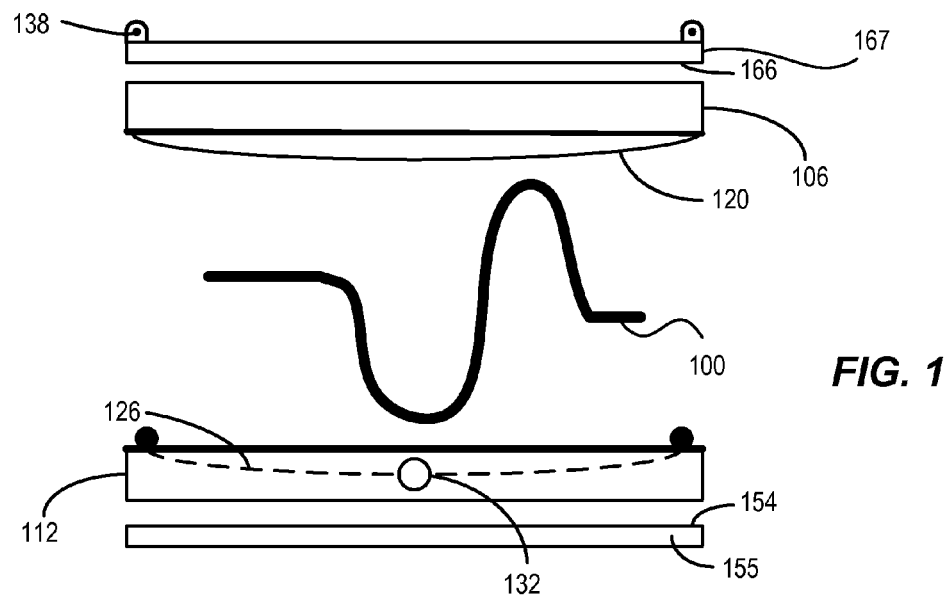

Reference throughout this document to "one embodiment", "certain example embodiments", "examples", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

The terms "a" or "an" or "the", as used herein, are defined as one or more than one.

The term "plurality" and "multiple", as used herein, is defined as two or more than two.

The term "another", as used herein, is defined as at least a second or more.

The use of numerical adjectives such as "first", "second", "third", etc., is generally intended as merely a label of convenience to enable ease of reference to a particular item or act without any implication of an order or hierarchy unless specifically stated otherwise.

The terms "top", "upper", "lower", "bottom" etc. are also not to be considered absolute, but the terms are merely used in conjunction with description of a particular example embodiment without limitation.

The terms "including" and/or "having" and/or "has", as used herein, are defined as comprising (i.e., open language).

The verb "is" should be considered open ended language that refers to an example, such that the term "A is a B" means that A is an example of something that can be used as B.

The term "coupled", as used herein, is defined as connected, although not necessarily directly, and not necessarily mechanically.

The use of any and all examples, or language indicating a example ("e.g." or "such as" or "for example") provided herein, is intended merely to better illuminate the invention and does not pose a limitation on the scope of the invention unless otherwise explicitly claimed. No language in the specification should be construed as indicating any non-claimed element as essential to the practice of the invention.

The terms "cure" or "fix" is used herein to mean that a piece of material that is molded cured, hardened or otherwise treated to cause the material to retain a molded shape. In one example, a sheet of moldable material may be heated then molded into shape and the material is allowed to cool so as to retain the molded shape.

The term "seal" is intended to mean that a volume is adequately closed to permit pumps or blowers used in the processes described to retain a functional level of vacuum. An absolute air/fluid tight seal is generally not a requirement so long as the degree of vacuum achieved serves the function of conforming the bladder to the master part of material being molded, and so long as the degree of vacuum achieved serves the function of keeping the particles in place during the molding process.

The term "particle" is used to mean small pieces of matter that are used to fill a mold compartment in the example processes as described. These loose particles can be of various sizes from powder size particles in the range of about 0.03 mm dia. to larger particles that are about 5 mm or even larger. Examples of particles that can be successfully used include: metal powders and filings, sawdust, cat litter, wheat germ, crushed cereal, grains such as chia or wheat, sand, gravel screenings, floor dry, glass or plastic beads or spheres. In certain example embodiments, light weight particles having an irregular shaped outer surface are generally more desirable than particles having a smooth spherical outer surface, but either will work.

The term "vacuum fused" as used herein means that particles are brought together and held in place with respect to each other by application of a vacuum to a chamber containing the particles. As used in this method, at least one flexible bladder or membrane reacts to the vacuum to pull the particles together as long as the vacuum is maintained to form a tool such as a fused particle tool/mold or vacuum fused particle tool/mold. The term "fused particle tooling" is represented by the abbreviation "FPT"

DETAILED DESCRIPTION

While this invention is susceptible of embodiment in many different forms, there is shown in the drawings and will be herein described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

In conventional processes for molding thermo-formable or thermo-set (i.e., thermoplastic) sheet material, the molds are hard tools that are costly to manufacture. Moreover, it can take a substantial amount of time to fabricate a mold or set of molds for use in such molding processes. In accord with the present teachings, a suitable mold can be made in minutes from a sample part. Such sample part can be fabricated, for example, by a 3D printer or other suitable machining or milling process or other suitable fabrication process, or may be a sample production part for which a mold is not available. Such sample part is used as a "master part" in the present example embodiments.

According to certain example methods as described herein of making a vacuum fused-particle tooling (FPT) involves bringing the outer surface of a flexible bladder into contact with a master part; drawing a first vacuum between the flexible bladder and the master part to cause the flexible bladder to conform to its shape; placing a quantity of particles inside the compartment in sufficient quantity and distribution to cover at least a portion of the inner surface of the flexible bladder that conforms to the shape of the master part; sealing the mold compartment with a rear bladder; drawing a second vacuum on the mold compartment to hold the quantity of particles in place; removing the first vacuum to release the master part; and maintaining the second vacuum on the compartment to retain the shape of the flexible bladder.

An example of an embodiment of a process for creating a fused particle molding tool is depicted in FIGS. 1-8. Turning first to FIG. 1, a master part is shown in profile as 100 situated between an upper frame 106 and a lower frame 112. At this stage, the mold halves are not yet completed, but will be formed within frames 106 and 112. The master part 100 will be used to fabricate the completed mold halves. Also, as a convention for this discussion, even though the upper and lower frames 106 and 112 will exchange places later in the process, the terms "upper" and "lower" are used to refer to the current position of the mold halves, but the reference numbers will be consistent with the illustration. The upper frame has a stretchable membrane-like bladder 120, for example made of bagging film (e.g., 1 mm or less thick), defining the front-side molding surface thereof. Similarly, the lower frame has a stretchable membrane-like bladder 126 defining the backside molding surface thereof.

The lower frame 112 is shown to have a pivot element 132 which provides for interchanging the upper/lower relationships of the frames 106 and 112 as will become clear later. The upper mold half can be lifted or lowered by any suitable mechanism which is depicted as a bracket 138 in the present drawings.

Figure 2:
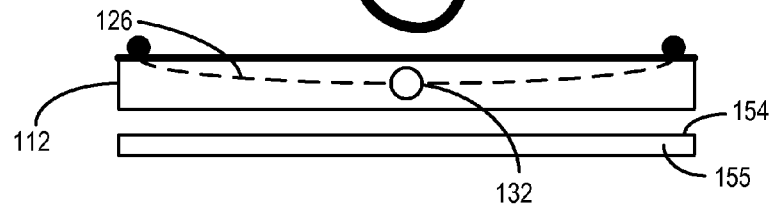

Referring to FIG. 2, the upper frame 106 is lowered into place atop the lower frame 112 with the master part 100 sandwiched in between. Guide pins or other alignment devices (not shown for clarity of illustration) can be used to assure consistent alignment of the molds when coupled together. Bringing the mold frame 106 and 112 together with the master part 100 in between stretches the membrane-like bladders so as to roughly conform to the shape of the master part 100. A seal is formed (represented by element 140) between the upper and lower frames 106 and 112 and a vacuum is drawn between the two frames 106 and 112 in place with the master part 100 therebetween. The bladders 120 and 126 conform to both sides of the master part 100 and create a runoff plane to the extremities of the frames 106 and 112. The vacuum is drawn within the space shown as 144.

Figure 3:
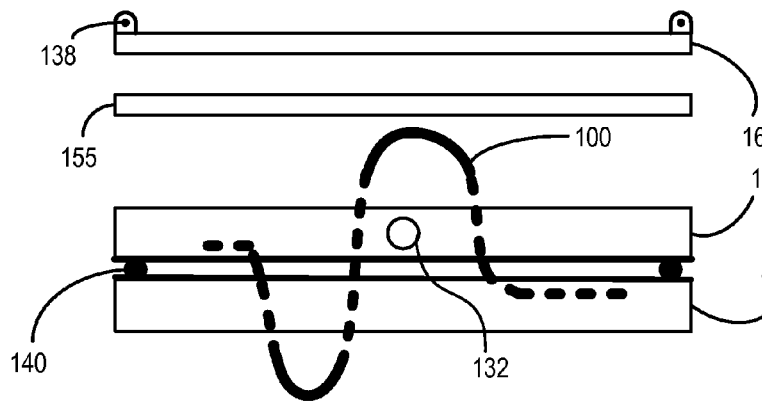

Referring now to FIG. 3, at this point in the present example process, the frames 106 and 112 are rotated 180 degrees about the pivot 132 so that the relative positions of the upper and lower frames are exchanged so that frame 112 is now in the upper position and frame 106 is now the lower position as shown. The exchange of upper and lower frame positions is done because the upper and lower frames are made separately and by reversing their positions at this point, the frame 106 will be at the top at the completion of the whole process for fabrication of the mold halves.

Figure 4:
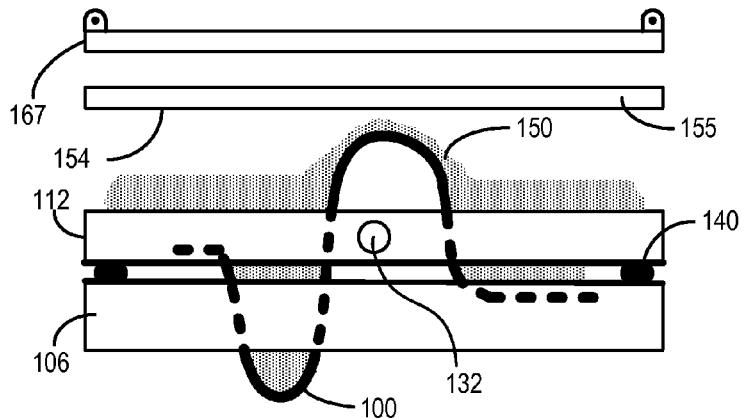

Referring to FIG. 4, a quantity of particles of solid material 150 is spread over the inner surface of the bladder at 126 that is now held fast by vacuum over the master part 100. The master part 100 is shown somewhat exaggerated above and below the mold frame for clarity. For molds of one foot square or greater, a one to two inch coating of the particles is a good starting point for determining how much of the particle material is to be added. The particles 150 of material may be any of a great many different types of material or mixtures thereof including, but not limited to: metal powders and filings, talc, sawdust, cat litter, wheat germ, crushed cereal, grains such as chia or wheat or flax or hemp or jute or wheat chaff, wheat or other grain, flour, grain meal, peat, seeds, sand blast beads, floor-dry clay, plastic, wooden or glass beads, natural fibers, gravel screenings, sand, particles such as sand combined with filler products or binders or binding agents, etc. as well as blends or multiple layers of such materials. In certain example embodiments, a first layer of fine particles, such as aluminum powder, can be applied as a first layer and a layer of more coarse particles such as sawdust can be applied as a second layer. Aluminum powder is useful as a first layer due to its good heat conduction properties (to help cool a thermoplastic work piece) as well as having fine particle size. In other example embodiments, a single type of particles can be used. The size of the particles can influence the smoothness of the finished mold surface and should be selected accordingly. Irregular shaped particles are less prone to movement in the finished mold since the particles will tend to lock themselves into position and not easily slide against one another.

Once the bladder's inner surface has been covered with the particles with a suitable coating at the areas adjacent the master part 100, a rear mold frame 155 having a bladder 154 is lowered into place and affixed to the rear of the upper mold frame 112. This rear bladder 154 conforms to the shape of the master part and the particles covering the master part. The upper mold frame 112 is thus turned into a sealed compartment.

Figure 5:
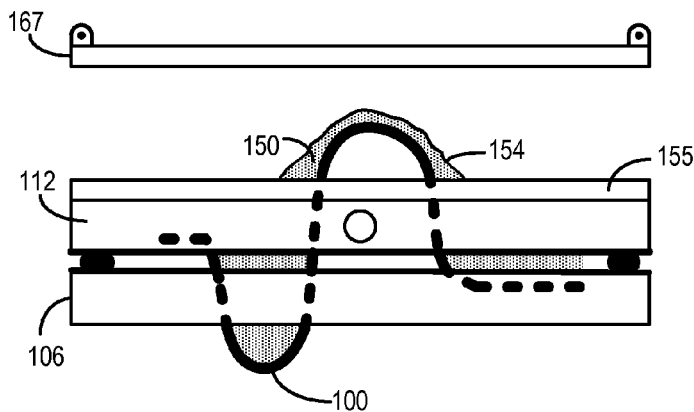

At this point, with reference to FIG. 5, a vacuum is drawn inside the sealed compartment of the upper mold frame 112 to draw the bladder 154 into tight contact with the particles compressing the particles together and against the master part 100 surface. This vacuum is retained for as long as the mold is in use so as to keep the particles 150 in place to cause the surface of the bladder 126 to retain the shape of the master part. The vacuum drawn on the sealed compartment of mold half 112 is a somewhat lower vacuum than the vacuum drawn between the two mold halves in space 144 so as to allow the membrane to appropriately conform and maintain the shape of the master part. Once frame 112 has undergone this process and is maintained under vacuum, it becomes a completed mold half (which is still referred to as 112 and as a frame in the present discussion).

At this point, mold half 112 is a completely formed fused particle mold half and is ready for use. In certain cases, the only one mold half is needed, in which case the term "half" as used in this discussion is not to be interpreted as a requirement that there be two molds formed in the manner disclosed. As noted before, the mold compartment is held under vacuum for as long as the mold half is in use in order to retain the particles 150 in place and essentially cause the bladder 126 to retain the shape of the master part 100. The remainder of the process essentially repeats what has been depicted to this point after rotation of the frames 106 and 112 about the pivot point 132 so as to move frame 106 back to the top. Many variations will occur to those skilled in the art upon consideration of the present teachings.

Figure 6:
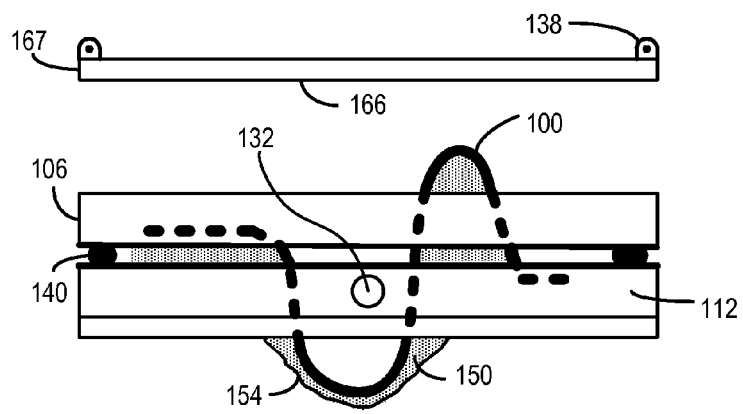

Referring now to FIG. 6, the frames 106 and 112 are rotated about pivot 132 so as to move frame 106 back to its position as the upper mold half. The vacuum at space 144 is retained throughout this process to keep the frames 106 and 112 in alignment with each other. As shown at FIG. 7, the inner part of frame 106 is now filled with particles 160 in much the same manner as previously described with particles fully covering the inner surface of bladder 120, taking extra care to assure that areas adjacent the master part have an adequate quantity of particles. A determination of the depth of particles that should be used depends on the particles, the master part, the size of the molds and other factors, but can be readily determined by trial and error. For a mold of size 1 ft×2 ft and for particles of about 0.040 in., a depth of about 2 inches was found quite satisfactory and formed a mold under 25" HG of vacuum that could withstand the weight of an average size person standing on the mold without significant deformation of the mold surface on visual inspection. For molds of 10 square foot or more, a 5 inch thick layer of particles is a reasonable starting point, but can be optimized by experimentation and will vary based on many factors.

Referring to FIG. 8, once the particles are in place, the outer frame 167 is lowered onto the frame 106 and affixed in place in order to stretch a rear bladder 166 into rough conformity with the top of the master part 100 as covered by the particles 160. The frame and rear bladder seal the mold compartment and a vacuum is drawn on the compartment of frame 106 to form a mold half 106 so as to pull the bladder 166 to compress the particles 160 into conformance with the surface of the master part 100 and hold the particles 160 in place to provide a rigid molding surface.

At FIG. 9, the mold halves can now be separated by removal of the vacuum at 144. The master part can now be removed and the mold halves 106 and 112 are ready for use in producing duplicates of the master part (in shape). Many variations and modifications will occur to those skilled in the art upon consideration of the present teachings.

Once the mold or molds or mold halves are completed, they can be successfully used to fabricate thermo-formable or thermo-set molded sheet material such as that used for automobile headliners and the like. As previously noted, the process is quick to perform and can be implemented using master parts that are also quickly created using, for example, 3D printing techniques or conventional machining processes. The resulting molds generally hold together well. Depending upon the level of detail that a particular part is to be rendered with, the mold can be used a few times or perhaps as many as a few hundred times. Since a new mold can be made in a matter of minutes, and since the molds can also be refreshed by replacing the master part between the mold halves, fully or partially releasing the vacuum inside the mold compartments and then re-applying the vacuum to the mold compartments (while the molds are mated together under vacuum), any number of production parts can be produced.

Figure 10:
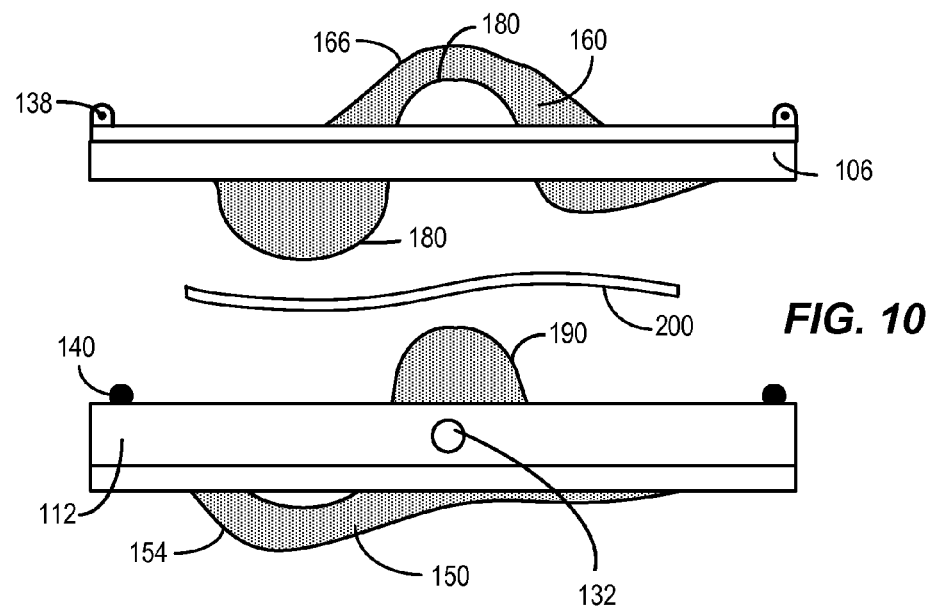
Figure 11:
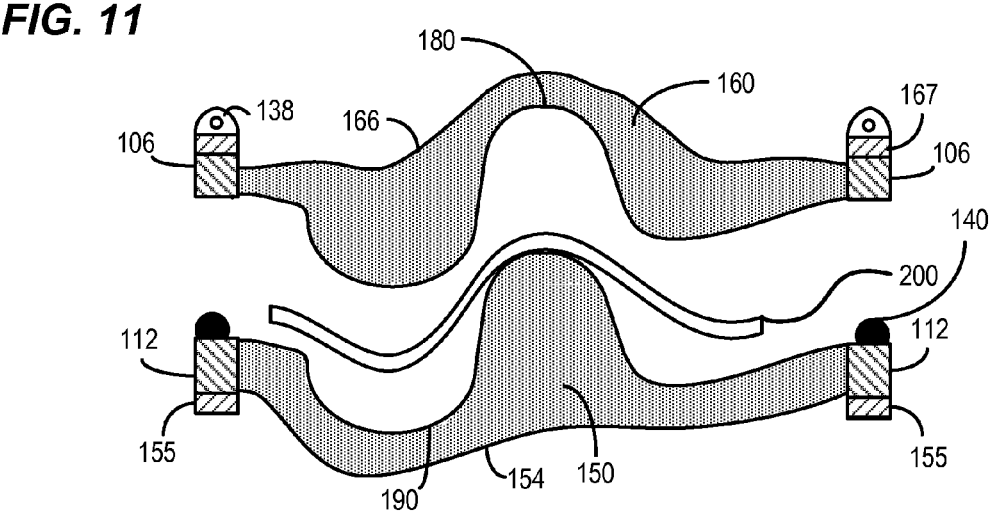
Figure 12:
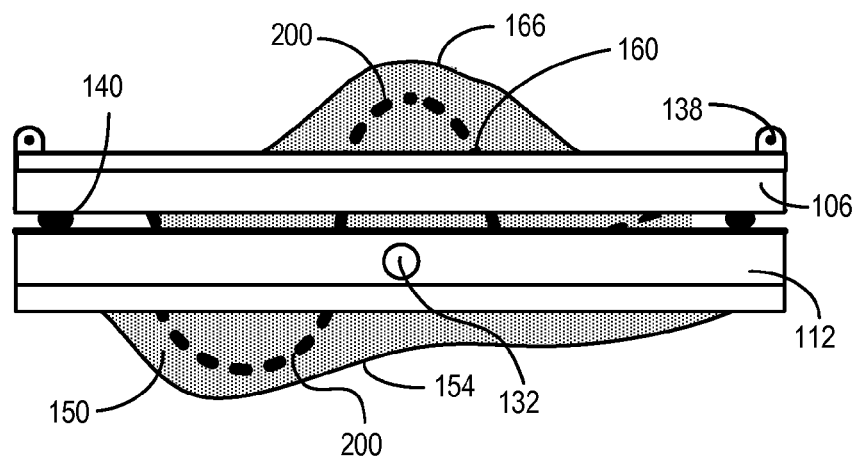
Figure 13:
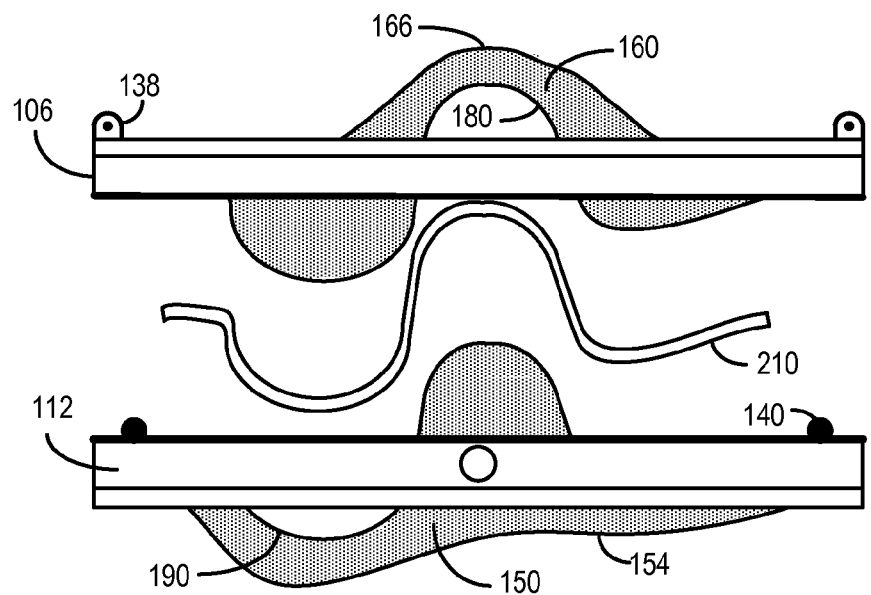

An example production process using a similar set of mold halves 106 and 112 is depicted in FIGS. 10-13. Referring first to FIGS. 10-11, where FIG. 11 is a section view is provided to make it easier for viewing, a sheet 200 of thermo-formable or thermo-set formable material (e.g., such as material used in automobile headliners) is placed between the upper mold half 106 and the lower mold half 112. Referring to FIG. 12, the molds are brought together and a vacuum is applied to the space between the molds thus drawing the thermo-formable or thermo-set sheet into contact with the inner surfaces 180 and 190 of the upper and lower mold bladders respectively. The molds are held in place while the thermo-formable or thermo-set sheet 200 is allowed to cool or otherwise cure and then as depicted in FIG. 13, the mold halves 106 and 112 are separated to release the finish molded part 210. This process can be repeated as desired until the mold halves 106 and/or 112 become unacceptably degraded, at which point they can be re-created or refreshed.

FIG. 14 briefly describes the example process 300 that has been discussed above in flow chart form starting at 304 after which a master part 100 is fabricated or otherwise provided for use in the process at 308. The master part 100 is situated between the upper and lower frames at 312 and the frames are brought together at 316 with the master part 100 sandwiched in between. The frames are rotated about a pivot and a vacuum is drawn between the upper and lower frames at 320 so that the bladders are pulled into contact with the master part 100.

At 324, a quantity of particles is distributed over the surface of the bladder of the lower mold half to cover the area of the master part. At 328, the lower mold half is closed with an additional bladder to form a compartment and a vacuum is drawn inside the lower mold half to affix the particles in place as long as the vacuum is held and complete forming the lower mold half. The frames are then rotated at 332 about the pivot to reverse the positions of the two mold halves placing the completed mold at the bottom. Particles are now distributed over the inside of the bladder of the upper mold half at 336 assuring that the areas adjacent the master part 100 are fully covered with a suitable thickness of particles.

The upper mold is then closed at 340 and a vacuum is drawn to affix the particles in place between the mold's upper and lower bladders. At this point the vacuum can be released at 344 between the two mold halves and the master part can be removed.

Production can begin at 348 by heating a sheet of material to be molded and the heated sheet is placed in position between the two mold halves. The mold halves are brought together at 352 and a vacuum is drawn between the two mold halves so as to cause the sheet to be pulled into conformity with the mold surfaces. The sheet is allowed to cool or otherwise fix or cure at 352. When the sheet is suitably cooled, the vacuum between the upper and lower mold halves is released and the mold separated to release the finished molded part at 356.

The process of 348 through 356 can be repeated at 360 to produce multiple parts. The molds should be periodically inspected for wear and as long as their condition is good and the quality of the finished parts is acceptable, the process can be repeated. If the mold condition becomes unacceptable at 364, the molds can be refreshed or re-created by use of the master part.

It is likely possible to refresh most mold halves one at a time by placing the master part 100 in position and fully or partially releasing the vacuum of the upper mold chamber and then reapplying the vacuum. The mold can then be rotated about the pivot and the new upper mold processed the same way. This mechanism is likely to work as long as there remains a sufficient quantity of particles situated adjacent the master part at the whole surface. Once a mold is processed by refreshing or re-creating at 370, the production can continue at 348 through 356.

Other variations will occur to those skilled in the art upon consideration of the present teachings. For example, instead of using a vacuum to hold the two frames in place, an arrangement clamping them together and forcing the particles together with air or water pressure could be utilized. Where a texture is desired, larger particles can be used, and where fine details are desired, smaller particles can be used. The sheet can be cooled more rapidly if the particles have good thermal conductivity to help draw the heat away. Also, cooling fluids can be pumped through the molds near the surface of the bladder to help speed the cooling process. Multiple layers of particles can also be used to place small particles adjacent the bladder and larger particles behind the smaller particles to reduce weight and more readily fill the mold chamber. Depending upon the sheet material being molded, a compatible release agent can be used to aid in removal of the molded part (and/or the master part). This also can reduce wear on the bladder material. The bladder material will generally hold up to use for several different mold cycles with several different master parts, but may be replaced when they show signs of wear. The mold can be used to quickly produce prototype parts or for small or large scale production runs with rapid turnaround of first parts. Other variations are also possible.

In prototypes, the vacuum drawn within the mold chambers was approximately 20-25" Hg. The vacuum drawn between the molds or between a mold and a molding surface was about 5-15" Hg. Molds used for prototypes were from about two square feet to about forty square feet. However, the amount of vacuum drawn will vary by work piece, size, and other factors.

Using the present teachings, a compression mold for forming thermo-formable and thermo-set materials can be made by holding particles under vacuum to retain a shape taken from a master part. The mold can be created in a matter of minutes and is capable of producing dozens or hundreds of parts. When finished the vacuum is released and the particles can be reused for creating another mold for the same or different parts.

Referring now to FIG. 15, an example of a mold half consistent with certain example embodiments is depicted in cross-section as mold half 400. The mold half may, for example be generally rectangular when viewed from above or below and is contained within a frame 404 made of a rigid material such as metal, wood, plastic, fiberglass, etc. At the lower surface (as shown) of the mold half is a membrane or bladder 408 made of a flexible film material such as flexible plastic bagging film which is readily commercially available. Bagging film having 0.5 mm thickness has been successfully used in experiments. For illustrative purposes, a simple trapezoidal profile is shown depicting the molding surface in this illustration. In this example, fine particles such as aluminum powder is used as a first layer 412 of particles adjacent the bladder 408. A second layer is made of more coarse particles shown as 416.

Since a vacuum is to be drawn and held within the mold compartment 420, a tube or manifold 426 to be used as a vacuum hose can be provided in a manner that ports the sealed mold compartment 420 to a vacuum pump. To avoid pulling particles into the vacuum hose, one or more layers of air permeable fabric material referred to as "breather cloth" 430 can be placed above the particles and between the particles and the vacuum hose. Multiple layers of this breather cloth can be used to help fill the compartment as well as to help minimize vacuuming up particles into the vacuum source.

The rear frame 405 (shown at the top) of the mold is made of a second bladder 434 which can also be made of a flexible membrane such as bagging film or a thicker rubber bladder because fine detail is not required. As depicted, the mold is under vacuum and is ready to mold.

The finished mold half has a frame that carries upper and lower bladders that form a compartment. The compartment is filled with particles that are drawn into intimate contact with a master part so as to cause the particles to conform to the profile of the master part. A vacuum pump 440 is connected to 426 in order to draw and maintain a vacuum on the compartment in order to lock the particles into position and conform to the shape of the master part. When the master part is removed, the shape is retained. As shown, in addition to particles 412 and 416, the compartment may also carry breather cloth and other filler materials.

A similar mold is depicted in FIG. 16, which differs in that one or more tubes 510 are provided near the lower bladder surface. A cooling fluid such as water can be pumped through these tubes to carry off heat from the heated thermoplastic material that is being molded so as to speed the fixing time of the material and reduce cycle time in the process.

Figure 17:
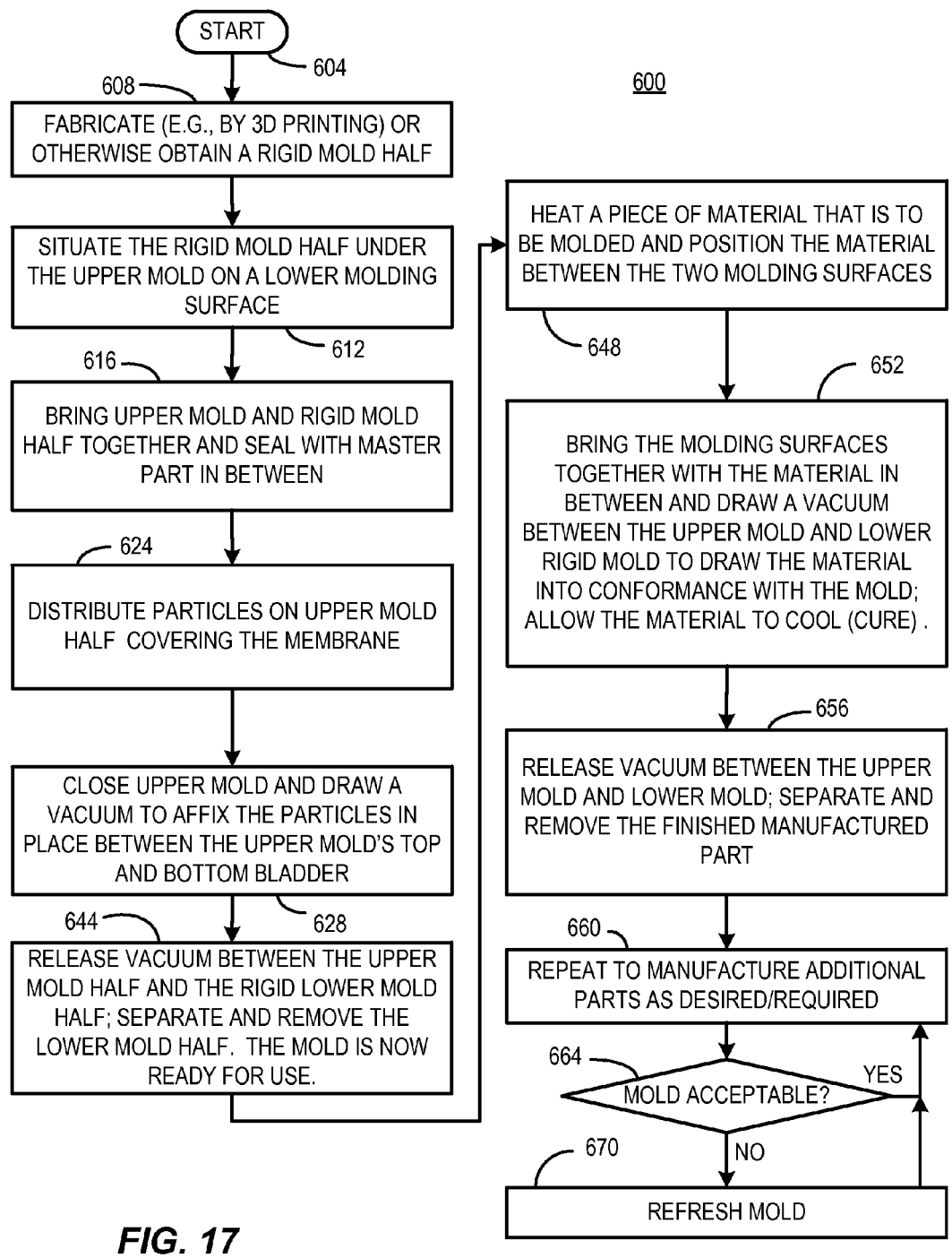
FIG. 17 is an example flow chart of an illustrative process for making a single vacuum fused particle mold and using a vacuum fused particle mold consistent with certain example embodiments of the present invention.

The process of forming a single sided mold that can be used to mold a sheet of material between the FPT mold half and a numerical control (NC) cut model or pre-formed surface can also be carried out. FIG. 17 briefly describes an example of such process 600 starting at 604 after which a rigid mold half is fabricated or otherwise provided for use in the process at 608. The mold half is situated between the upper bladder frame and a lower surface at 612 and the upper bladder and molding surface are brought together under vacuum at 616 with the bladder conforming to the rigid mold half.

At 624, a quantity of particles is distributed over the surface of the bladder of the upper mold half to at least cover the areas of the molding surface, but generally a quantity of particles is distributed over the entire bladder surface. At 628, the mold half is closed to form a compartment which will permit a vacuum to be drawn inside the upper mold half to affix the particles in place as long as the vacuum is held.

A vacuum is drawn to affix the particles in place between the mold's upper and lower bladders. At this point the vacuum can be released at 644 between the upper mold half and the molding surface of the ridged lower mold half.

Production can begin at 648 by heating a sheet of material to be molded and the heated sheet is placed in position between the two molding surfaces. At 652 and a vacuum is drawn between the upper mold and the ridged surface so as to cause the sheet to be pulled into conformity with the two surfaces. The sheet is allowed to cool or otherwise fix or cure at 652. When the sheet is suitably cooled, the vacuum between the two molding surfaces is released at 656 and the mold separated to release the finished molded part.

The process of 648 through 656 can be repeated at 660 to produce multiple parts. The molds should be periodically inspected for wear and as long as their condition is good and the quality of the finished parts is acceptable, the process can be repeated. If the mold condition becomes unacceptable at 664, the upper mold half can be refreshed or re-created by use of the riged lower molding surface. It is less likely for the need to refresh the upper mold half when the other mold half is a fixed ridged surface.

Thus, as illustrated in FIG. 18, a method of creating a mold, consistent with certain example embodiments involves providing a mold having a mold compartment with a flexible bladder defining one side thereof at 704, the flexible bladder defining the one side having an inner surface and an outer surface; at 708, bringing the outer surface of the flexible bladder into contact with a master part having a shape; at 712, drawing a first vacuum between the bladder and the master part to cause the bladder to conform to the shape of the master part; at 716, placing a quantity of particles inside the compartment in sufficient quantity and distribution to cover at least a portion of the inner surface of the bladder that conforms to the shape of the master part, although in most instances the entire inner surface of the mold's main bladder is covered with particles to make a rigid structure when the vacuum is drawn; at 720, sealing the mold compartment; at 724, drawing a second vacuum on the mold compartment to hold the quantity of particles in place; at 728, removing the first vacuum to release the master part; and at 732, maintaining the second vacuum on the compartment to retain the shape of the bladder.

Figure 19:
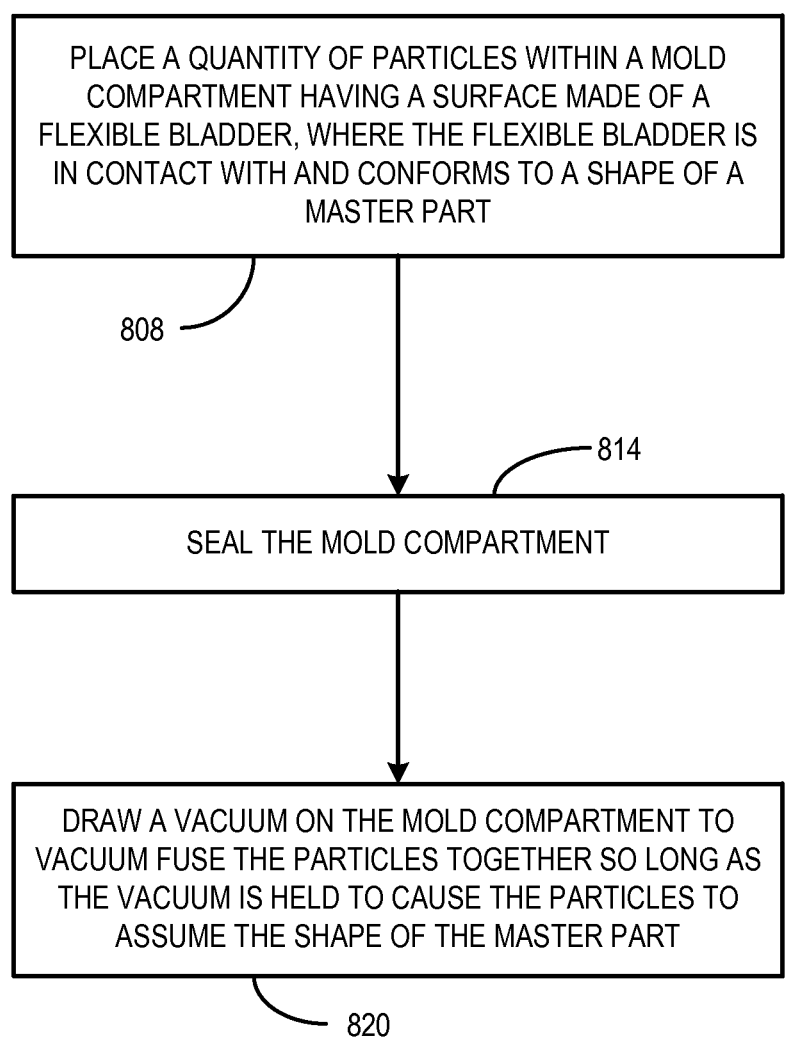
FIG. 19 is another example flow chart of an illustrative process for making a fused particle mold in a manner consistent with certain example embodiments of the present invention.

Another method consistent with the present teachings is depicted in FIG. 19 which includes placing a quantity of particles within a mold compartment having a surface made of a flexible bladder, where the flexible bladder is in contact with and conforms to a shape of a master part at 808; at 814, sealing the mold compartment; and at 820, drawing a vacuum on the mold compartment to vacuum fuse the particles together so long as the vacuum is held to cause the particles to assume the shape of the master part.

The particles fuse and retain the shape of the master part as long as vacuum is maintained on the chamber(s). According to the present teachings, no additional material in the form of adhesive is needed to retain the shape. Hence, the vacuums in the chambers are drawn in the absence of a curable fixative that hardens the mold for example an adhesive such as epoxy, fiberglass resin, glue, foam, or the like. In this manner the same molds can be used over and over for the same or different master parts. It is noted that after many uses, the bladder can become worn and develop leaks that degrade the bladder's usefulness. Hence, the molds may be constructed in a manner that allows for replacement of the bladders when they exhibit excessive wear or develop defects.

Thus in certain implementations, a method that is carried out in any operative order involves: a— providing a mold having a mold compartment with a flexible bladder defining one side thereof, the flexible bladder defining the one side having an inner surface and an outer surface; b— bringing the outer surface of the flexible bladder into contact with a master part having a shape; c— drawing a first vacuum between the flexible bladder and the master part to cause the flexible bladder to conform to the shape of the master part; d— placing a quantity of particles inside the compartment in sufficient quantity and distribution to cover at least a portion of the inner surface of the flexible bladder that conforms to the shape of the master part; e— sealing the mold compartment with a rear bladder; f— drawing a second vacuum on the mold compartment to hold the quantity of particles in place; g— removing the first vacuum to release the master part; and h— maintaining the second vacuum on the compartment to retain the shape of the flexible bladder.

In certain example implementations, the method further involves placing a sheet of material into contact with the outer surface of the flexible bladder; causing the sheet of material to conform to the shape of the outer surface of the flexible bladder; and fixing the sheet of material to retain the shape. In certain example implementations, placing the quantity of particles further involves: placing a first layer of particles directly adjacent the inner surface of the flexible bladder; and placing a second layer of particles on top of the first layer of particles. In certain example implementations, the particles of the first layer of particles have an average size smaller than an average size of the particles in the second layer of particles. In certain example implementations, the method further involves placing one or more layers of air permeable fabric over the second layer of particles and under the rear bladder. In certain example implementations, the method further involves placing one or more layers of air permeable fabric over the layer of particles and under the rear bladder. In certain example implementations, the mold includes a first mold, and further includes repeating a through h to create a second mold. In certain example implementations, the first vacuum is drawn between the first mold and the second mold. In certain example implementations, the first vacuum is a molding vacuum and the second vacuum is a tooling vacuum; and where the molding vacuum is weaker than the tooling vacuum when molding parts. In certain example implementations, the quantity of particles is adequate to cover the bladder to a thickness of at least one inch.

Another example method consistent with the present teachings carried out in any operative order, involves: a— providing a first and a second mold half, each having a bladder frame with a mold compartment with a flexible bladder defining one side thereof, the flexible bladder defining the one side having an inner surface and an outer surface; b— bringing the outer surface of the flexible bladder of the first and second mold halves into contact with a master part having a shape; c— drawing a first vacuum between the flexible bladders of the first and second mold halves with the master part in between to cause the flexible bladders to conform to the shape of the master part; d— placing a quantity of particles inside the compartments in sufficient quantity and distribution to cover at least a portion of the inner surface of the flexible bladder that conforms to the shape of the master part; e— sealing the mold compartments of the first and second bladder frames with first and second rear bladders; f— drawing a second vacuum on the mold compartments to hold the quantity of particles in place in both mold compartments; g— removing the first vacuum to release the master part; and h— maintaining the second vacuum on the mold compartment to retain the shape of the flexible bladder.

In certain example implementations, the particles are added to the first and second compartments individually, and the process further includes rotating the first and second mold halves while the first vacuum is applied. In certain example implementations, the process further involves: placing a sheet of material into contact with the outer surfaces of the flexible bladders; causing the sheet of material to conform to the shape of the outer surface of the flexible bladder; and fixing the sheet of material to retain the shape. In certain example implementations, placing the quantity of particles further involves placing a first layer of particles directly adjacent the inner surface of at least one of the flexible bladders; and placing a second layer of particles on top of the first layer of particles on the at least one of the flexible bladders. In certain example implementations, the particles of the first layer of particles have an average size smaller than an average size of the particles in the second layer of particles. In certain example implementations, the method further involves placing one or more layers of air permeable fabric over the second layer of particles and under the rear bladder. In certain example implementations, the method further includes placing one or more layers of air permeable fabric over the layers of particles and under the rear bladders. In certain example implementations, the first vacuum is stronger than the second vacuum during the making of the mold.

Another example method consistent with the present teachings involves: placing a quantity of particles within a mold compartment having a surface made of a flexible bladder, where the flexible bladder is in contact with and conforms to a shape of a master part; sealing the mold compartment; and drawing a vacuum on the mold compartment to vacuum fuse the particles together so long as the vacuum is held to cause the particles to assume the shape of the master part.

In certain example implementations, the compartment exhibits an absence of a curable fixative. In certain example implementations, placing the quantity of particles further involves placing a first layer of particles directly adjacent the inner surface of the flexible bladder, and placing a second layer of particles on top of the first layer of particles. In certain example implementations, the particles of the first layer of particles have an average size smaller than an average size of the particles in the second layer of particles.

An example finished mold or mold half consistent with the present teachings has a frame that carries upper and lower bladders to form a compartment. The compartment contains particles that are drawn into intimate contact with a master part contacting one of the bladders so as to cause the particles to conform to the profile of the master part. A source of vacuum draws and maintains a vacuum on the compartment in order to lock the particles into position and conform to the shape of the master part. In certain implementations, multiple types of particles can be used. In certain implementations, multiple layers of particles can be used. In certain implementations, the compartment also contains breather cloth. In certain embodiments, the compartment also contains a manifold through which a vacuum pump pulls a vacuum on the mold. In certain embodiments, the compartment further contains tubing that is used to carry a fluid that is pumped through the mold to facilitate cooling.

Many variations will occur to those skilled in the art upon consideration of the present teachings.

All references, including publications, patent applications, patents, and website content cited herein are hereby incorporated by reference to the same extent as if each reference were individually and specifically indicated to be incorporated by reference and was set forth in its entirety herein.

While certain illustrative embodiments have been described, it is evident that many alternatives, modifications, permutations and variations will become apparent to those skilled in the art in light of the foregoing description.

What is claimed is:

1. A method carried out in any operative order, comprising:
   a— providing a mold having a mold compartment with a flexible bladder defining one side thereof, the flexible bladder defining the one side having an inner surface and an outer surface;
   b— bringing the outer surface of the flexible bladder into contact with a master part having a shape;
   c— drawing a first vacuum between the flexible bladder and the master part to cause the flexible bladder to conform to the shape of the master part;
   d— placing a quantity of particles inside the compartment in sufficient quantity and distribution to cover at least a portion of the inner surface of the flexible bladder that conforms to the shape of the master part, where the quantity of particles comprise a first layer of first particles adjacent the inner surface of the flexible bladder and a second layer of second particles on top of the first layer of first particles, where the first particles have characteristics that are different than characteristics of the second particles;
   e— sealing the mold compartment with a rear bladder;
   f— drawing a second vacuum on the mold compartment to hold the quantity of particles in place;
   g— removing the first vacuum to release the master part; and
   h— maintaining the second vacuum on the compartment to retain the shape of the flexible bladder.

2. The method according to claim 1, further comprising:
   placing a sheet of material into contact with the outer surface of the flexible bladder;
   causing the sheet of material to conform to the shape of the outer surface of the flexible bladder; and
   fixing the sheet of material to retain the shape.

3. The method according to claim 1, where the first particles are made of a first material and the second particles are made of a second material.

4. The method according to claim 1, where the first particles of the first layer of particles have an average size smaller than an average size of the second particles in the second layer of particles.

5. The method according to claim 1, further comprising placing one or more layers of air permeable fabric over the second layer of second particles and under the rear bladder.

6. The method according to claim 1, further comprising placing one or more layers of air permeable fabric over the first and second layers of particles and under the rear bladder.

7. The method according to claim 1, where the first layer of particles comprises a layer of metallic particles and where the second layer of particles comprises non-metallic particles.

8. The method according to claim 7, where the first vacuum is drawn between the first mold and the second mold.

9. The method according to claim 8, where the first vacuum is a molding vacuum and the second vacuum is a tooling vacuum; and where the molding vacuum is weaker than the tooling vacuum when molding parts.

10. The method according to claim 1, where the combined quantity of first and second particles is adequate to cover the bladder to a thickness of at least one inch.

11. A method carried out in any operative order, comprising:
  a— providing a first and a second mold half, each having a bladder frame with a mold compartment with a flexible mold bladder defining one side thereof, the flexible mold bladder defining the one side having an inner surface and an outer surface;
  b— bringing the outer surface of the flexible mold bladders of the first and second mold halves into contact with a master part having a shape;
  c— drawing a first vacuum between the flexible mold bladders of the first and second mold halves with the master part in between to cause the flexible mold bladders to conform to the shape of the master part;
  d— placing a quantity of particles inside the compartments in sufficient quantity and distribution to cover at least a portion of the inner surfaces of each of the flexible mold bladders that conforms to the shape of the master part, where the particles are of irregular shape, and where the quantity of particles comprise a first layer of first particles adjacent the inner surfaces of the flexible mold bladders and a second layer of second particles outside of the first layer of first particles;
  e— sealing the mold compartments of the first and second bladder frames with first and second rear bladders;
  f— drawing a second vacuum on the mold compartments to hold the quantity of particles in place in both mold compartments;
  g— removing the first vacuum to release the master part; and
  h— maintaining the second vacuum on the mold compartment to retain the shape of the first and second flexible mold bladders.

12. The method according to claim 11, where the particles are added to the first and second compartments individually, and further comprising rotating the first and second mold halves while the first vacuum is applied.

13. The method according to claim 11, further comprising:
  placing a sheet of material into contact with the outer surfaces of each of the flexible mold bladders;
  causing the sheet of material to conform to the shape of the outer surfaces of each of the flexible mold bladders; and
  fixing the sheet of material to retain the shape.

14. The method according to claim 11, where the first layer of particles comprises a layer of metallic particles and where the second layer of particles comprises non-metallic particles.

15. The method according to claim 11, where the particles of the first layers of particles have an average size smaller than an average size of the particles in the second layers of particles.

16. The method according to claim 11, further comprising placing one or more layers of air permeable fabric over the second layers of particles and under the rear bladders.

17. The method according to claim 11, further comprising placing one or more layers of air permeable fabric between the layers of particles and the rear bladders.

18. The method according to claim 11, where the first vacuum is stronger than the second vacuum during the making of the mold.

19. A method, comprising:
  placing a quantity of particles within a mold compartment having a surface made of a flexible bladder, where the flexible bladder is in contact with and conforms to a shape of a master part;
  where the quantity of particles comprise a first layer of first particles adjacent the inner surface of the flexible bladder and a second layer of second particles on top of the first layer of first particles, where the first particles have characteristics that are different than characteristics of the second particles;
  sealing the mold compartment; and
  drawing a vacuum on the mold compartment to vacuum fuse the particles together so long as the vacuum is held to cause the particles to assume the shape of the master part.

20. The method according to claim 19, where the compartment exhibits an absence of a curable fixative.

21. The method according to claim 19, where the first layer of particles comprises a layer of metallic particles and where the second layer of particles comprises non-metallic particles.

22. The method according to claim 19, where the particles of the first layer of particles have an average size smaller than an average size of the particles in the second layer of particles.

23. The method according to claim 1 where the first particles and second particles are of irregular shape.

24. A method carried out in any operative order, comprising:
  a— providing a mold having a mold compartment with a flexible bladder defining one side thereof, the flexible bladder defining the one side having an inner surface and an outer surface;
  b— bringing the outer surface of the flexible bladder into contact with a master part having a shape;
  c— drawing a first vacuum between the flexible bladder and the master part to cause the flexible bladder to conform to the shape of the master part;
  d— placing a quantity of particles inside the compartment in sufficient quantity and distribution to cover at least a portion of the inner surface of the flexible bladder that conforms to the shape of the master part, where the placing comprises placing a first layer of particles directly adjacent the inner surface of the flexible bladder and placing a second layer of particles on top of the first layer of particles;
  e— placing one or more layers of air permeable fabric over the second layer of particles and under the rear bladder
  f— sealing the mold compartment with a rear bladder;
  g— drawing a second vacuum on the mold compartment to hold the quantity of particles in place;
  h— removing the first vacuum to release the master part; and
  i— maintaining the second vacuum on the compartment to retain the shape of the flexible bladder.

25. The method according to claim 24, further comprising placing one or more layers of air permeable fabric over the layer of particles and under the rear bladder.

26. A method carried out in any operative order, comprising:
- a— providing a first and a second mold half, each having a bladder frame with a mold compartment with a flexible bladder defining one side thereof, the flexible bladder defining the one side having an inner surface and an outer surface;
- b— bringing the outer surface of the flexible bladder of the first and second mold halves into contact with a master part having a shape;
- c— drawing a first vacuum between the flexible bladders of the first and second mold halves with the master part in between to cause the flexible bladders to conform to the shape of the master part;
- d— placing a quantity of particles inside the compartments in sufficient quantity and distribution to cover at least a portion of the inner surface of the flexible bladder that conforms to the shape of the master part, where the particles are added to the first and second compartments individually, and where placing the quantity of particles further comprises: placing a first layer of particles directly adjacent the inner surface of at least one of the flexible bladders, and placing a second layer of particles on top of the first layer of particles on the at least one of the flexible bladders;
- e— placing one or more layers of air permeable fabric over the second layer of particles and under the rear bladder;
- f— sealing the mold compartments of the first and second bladder frames with first and second rear bladders;
- g— drawing a second vacuum on the mold compartments to hold the quantity of particles in place in both mold compartments;
- h— rotating the first and second mold halves while the first vacuum is applied;
- i— removing the first vacuum to release the master part;
- j— maintaining the second vacuum on the mold compartment to retain the shape of the flexible bladder;
- k— placing a sheet of material into contact with the outer surfaces of the flexible bladders;
- l— causing the sheet of material to conform to the shape of the outer surface of the flexible bladder; and
- m— fixing the sheet of material to retain the shape.

27. The method according to claim 26, where placing the quantity of particles further comprises:
placing a first layer of particles directly adjacent the inner surface of at least one of the flexible bladders; and
placing a second layer of particles on top of the first layer of particles on the at least one of the flexible bladders.

* * * * *